2,872,491

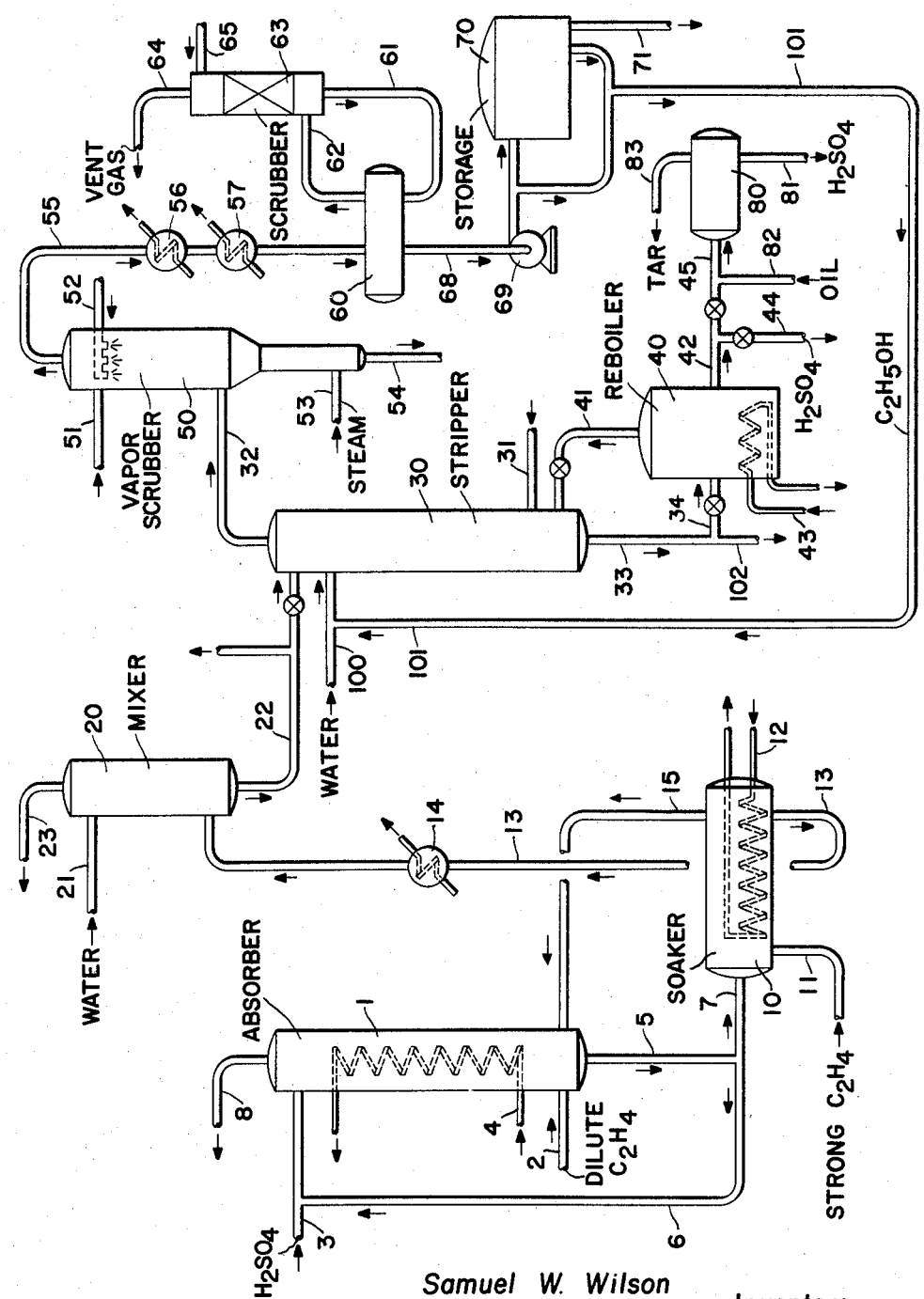

CRUDE ETHANOL OPERATIONS

Samuel Winfield Wilson and Walter Henry Silver, Baton Rouge, La., assignors to Esso Research and Engineering Company, a corporation of Delaware Application June 19, 1957, Serial No. 666,532

6 Claims. (Cl. 260—639)

This invention relates to an improved preparation of ethyl alcohol from ethylene. More particularly, the invention relates to an improved process wherein ethylene is esterified with strong sulfuric acid and hydrolyzed to ethanol. Still more particularly, it relates to the improvement which comprises flushing the alcohol extract stripper tower and/or reboiler with product ethanol, or other alcohols, in order to eliminate fouling of those towers.

It is known that alcohols may be manufactured from the corresponding olefins via the acid ester. For instance, in a process for the production of ethyl alcohol, ethylene is charged to an absorber where it is esterified and extracted by 96–100% sulfuric acid. The acid extract of diethyl sulfate and monoethyl sulfate is then hydrolyzed with water in a mixer to form an equilibrium mixture of ethyl alcohol, monoethyl sulfate, and some diethyl ether. The diluted extract is then stripped with steam in an extract stripper to convert the monoethyl sulfate to ethyl alcohol and to remove the alcohol and ether overhead. The overhead stream is then usually caustic scrubbed, cooled, and the product ethyl alcohol is diluted and stored.

In the process of olefin absorption, extract soaking, hydrolysis, stripping, and acid reconcentration, some soluble carbonaceous materials are formed either inherently or as a result of feed impurities such as acetylene, oil, etc. The nonhydrolyzable carbonaceous materials remain in solution with the acid throughout the entire cycle, but become insoluble in the subsequent cycle. It seems that during acid reconcentration in atmospheric or vacuum concentrators and fortification with $SO_3$ to give 96–100% acid suitable for recycle to the olefin absorption zone, the carbonaceous materials are converted to forms which are insoluble in the diluted acid-alcohol extract of the subsequent cycle. Considerable fouling of the stripper tower and the reboiler by the tar-like insoluble carbonaceous materials is therefore unavoidable. Such fouling ultimately decreases stripping efficiency and tower capacity to such an extent that it is necessary to open the tower, remove the trays and bubble caps, and manually clean the tower and parts. The reboiler also must be shut down and manually cleaned, especially the heating elements and outlet lines. This results in a shutdown of several days, causing considerable loss in production and high costs of labor.

Several methods have been developed in an effort to eliminate altogether such a costly shutdown. The spent acid has been treated with certain wash oils following stripping to extract the insoluble carbonaceous materials, but since it is the soluble (non-extractable) carbonaceous materials which cause fouling by becoming insoluble in the subsequent cycle, this wash treatment does not protect the stripper. The methods of adding oil directly to the stripper during distillation and adding sulfonates and the like to the acid have also been suggested, as well as acid filtration. None of these methods, however, have been altogether satisfactory in solving the problem of fouling. Consequently, manufacturers today still resort to periodically shutting down the operation and manually cleaning the fouled equipment.

Therefore, it is an object of this invention to provide an operation for the production of ethanol eliminating or alleviating the need for long plant shutdown periods. Further, it is an object of this invention to provide a continuous, efficient, and high capacity process for the manufacture of ethanol. These and other objects, as well as the general nature, advantages, and operation will become more clearly apparent from the subsequent description.

Unless otherwise designated, all ratios and percentages recited herein will be given on a weight basis.

The attached diagram represents the preferred embodiment of the present invention.

It has now been discovered that ethanol operations can be improved by periodically scrubbing or "flushing" the extract stripper and reboiler with product ethanol or other water soluble alcohols. For instance, with reference to the ethyl alcohol manufacture described hereinbefore, by cutting the dilute extract out of the stripping tower and reboiler and flushing those units with product crude ethanol, the tower and reboiler can be cleaned in 4 to 8 hours. Usually water and alcohol are supplied to the stripper, the alcohol soluble carbonaceous materials dissolve in the alcohol-water mixture, and the mixture passes through the reboiler to the sewer or alcohol recovery unit. When the carbonaceous materials are essentially removed, heat is supplied to the reboiler permitting recovery of the alcohol overhead and removal of the remaining acid insoluble carbonaceous materials from the reboiler in an emulsified form with the remaining alcohol-water mixture. Of course, many alternative means of introducing alcohol and water to the stripper, refluxing the alcohol-water mixtures, and recovering and disposing of the aqueous tarry emulsion will become apparent to one skilled in the art, when the present invention is fully set forth.

The present invention will be better understood when described with reference to the preferred embodiment represented by the attached diagram. Referring now to the diagram, feed ethylene, about 30 to 60 mol percent pure (balance mostly ethane, methane, and hydrogen), is introduced to absorber 1 through line 2. 96 to 100% sulfuric acid is introduced to the top of absorber 1 via line 3 in an amount of about 0.7 to 1.0 mole per mole of ethylene in the feed. The absorber is maintained at pressures between about 300 and 500 p. s. i. g. and temperatures between about 60 and 80° C. It is desirable to control the temperature in the absorber by water circulated throughout the column, such as through coil 4, which extends the entire length of the column, or through a plurality of coils, each located on a tray of a conventional bubble cap column, or by other means well known to those skilled in the art. After an acid residence time of 0.25 to 1.0 hour, the acid extract is removed from absorber 1 through line 5 at a saturation of between 0.8 and 1.2, preferably about 1.0, i. e., one mole of ethylene per mole of $H_2SO_4$. A portion of the extract is recycled from the bottom to the top of the absorber via lines 6 and 3 to give an extract saturation of about 0.4 to 0.6 when mixed with the fresh acid, while the balance of the extract flows through line 7 to soaker 10. Vent gas is released through line 8.

Strong ethylene, about 40 to 60 mol percent pure, is introduced to soaker 10 through line 11. The extract is strengthened to a saturation of about 1.2 to 1.4, preferably about 1.4, after a residence time of 2 to 8 hours in soaker 10, which is maintained at pressures of 300 to 500 p. s. i. g. and temperatures between about 70 and 90° C., controlled by water circulated in coil 12. Vent gas is discharged through line 15. If desired, additional stages of absorbers and soakers may be included, but the total residence time in all the absorber and soaker stages preferably ranges between 3 and 8 hours.

The strong acid extract, consisting essentially of diethyl sulfate and monoethyl sulfate, next passes from soaker 10, or from a subsequent additional soaker, through line 13 and heat exchanger 14 to mixer 20. Water is admitted through line 21 in an amount sufficient to give 50–55% $H_2SO_4$ on an alcohol, ether, and ester free basis. The mixer 20 is operated at a temperature of about 100 to 130° C. and a pressure of about 60 to 100 p. s. i. g., thereby hydrolyzing in a period of 1 to 15 minutes substantially all of the diethyl sulfate and some of the monoethyl sulfate to ethyl alcohol and a small proportion of diethyl ether. The hydrolyzed product may then flow through a hydrolyzer operating at 2 to 80 p. s. i. g. and 100° to 120° C. in order to assure complete hydrolysis, but this is not necessary and is not shown in the instant diagram. Vent gas is released from the mixer through line 23.

The hydrolyzed product of ethyl alcohol, diethyl ether, monoethyl sulfate, and 50–60% $H_2SO_4$ on an ether and alcohol free basis, is passed from mixer 20 via line 22 into the top of stripper or generator 30 which may conveniently be a bubble cap, packed, or similar type column, typically about 6 feet in diameter and about 40 feet in height and having 10 to 12 bubble cap trays. Steam is admitted through lines 31 and/or 41 in an amount sufficient to maintain a temperature of about 130° to 150° C. at the bottom of the stripper and about 110° to 130° C. at the top. Stripper pressure is kept in the range of 1.0 to 2.5 p. s. i. g. at the top and 5 to 8 p. s. i. g. at the bottom. The monoethyl sulfate is largely converted into ethyl alcohol in the stripper, and the alcohol and ether are recovered overhead through line 32. The stripped sulfuric acid, 50–55% $H_2SO_4$, is removed as bottoms through line 33, and passed to reboiler 40 via line 34.

Reboiler 40 may be any conventional type reboiler, preferably a Simonson-Mantius type as described in "Sulfuric Acid Manufacture," Andrew M. Fairlie (1936), pages 299–306. This reboiler is normally operated at about 0 to 10 p. s. i. g. pressure and 160 to 170° C. outlet temperature, so that the vapors discharged through line 41 will supply a major portion of the steam required by stripper 30 and the sulfuric acid is concentrated to 60–68% $H_2SO_4$. The heat for the reboiler is supplied in any convenient manner such as by Dowtherm coil 43. More than one combination of stripper and reboiler may be employed if desired. The acid is removed through lines 42 and 44 to be concentrated, fortified with $SO_3$, and recycled to absorber 1 in an otherwise well known manner. Alternatively the acid may be passed via lines 42 and 45 together with scrubbing oil admitted through line 82 into tar separator 80. Tar is removed in the oil phase through line 83. Tar-free acid is removed through line 81, then further concentrated, fortified, and recycled to the absorber in an otherwise well known manner.

The vapor product removed from stripper 30 is passed by line 32 to vapor scrubber 50, where it is contacted with an alkaline solution such as sodium hydroxide introduced through line 51. Water may be sprayed into scrubber 50 through line 52 to prevent or reduce caustic concentration, salting out, and entrainment in the alcohol. Steam is added through line 53 to strip out any alcohol dissolved in the alkaline solution. The spent caustic is passed to the sewer via line 54, and the scrubbed crude alcohol is recovered overhead via line 55. This stream is then condensed in condenser 56, cooled in cooler 57, and introduced to accumulator 60. Here the crude ethanol is diluted from 50 to 60 volume percent to about 40 volume percent by adding water via line 61. Vent gas is removed through line 62 to vent gas scrubber 63 where it is scrubbed with water admitted through line 65. Vent gas is discarded through line 64. The spent water from scrubber 63 supplies the water for accumulator 60 via line 61.

The product ethanol is then passed from accumulator 60 to storage tank 70 via line 68 and pump 69. Ethanol may be withdrawn through line 71 for further operations and uses.

The present improvement resides particularly in the flushing operation which will now be described. When fouling has progressed as far as tolerable, e. g., after the unit has been on stream for 3 to 6 months, the extract entering stripper 30 through line 22 is cut off and the contents of stripper 30 and reboiler 40 are dumped via lines 102 and 44 to an accumulator. Cool water at a temperature of 26 to 35° C., preferably about 28° C., is introduced via line 100 to stripper 30. This water is fed at a rate of about 1,000 to 3,000 gallons per hour until the bottoms temperature of the stripper is reduced to about 90° C. or less and the top temperature to 70° C. or less. The steam entering through line 31 is stopped and the heat supplied reboiler 40 by coil 43 is reduced so that the reboiler temperature is reduced to about 90 to 110° C. Ethyl alcohol, at a strength of 40 volume percent, is then pumped from accumulator 60 or storage tank 70 back to the top of stripper 30 via lines 101 and 100. A typical 6-foot diameter, 40-foot high column requires an alcohol rate of about 2,000 to 6,000 gallons per hour, preferably about 4,000 gallons per hour, for a period of from 20 to 40 minutes. This rate may be more conveniently expressed as about 0.2 to 0.7 volume of alcohol per volume of stripper tower per hour, or about 9 to 30 cubic feet alcohol per square foot cross-sectional area of stripper tower per hour. Water is simultaneously added via line 100 at a rate sufficient to dilute the alcohol to about 10 to 20 volume percent.

It should be understood at this point that the recycle of product alcohol merely represents the preferred embodiment of the present invention. Any water soluble alcohol or water solutions thereof, such as isopropanol and water solutions of butanol, may be introduced to the stripper as the flushing solvent. The carbonaceous materials have been found to be soluble in aqueous alcohol, but not in acid.

As the alcohol-water mixture passes from the stripper into the reboiler, a portion of the alcohol is vaporized by the reboiler heat and recycled via line 41 to the stripper. After the flow of the alcohol-water mixture from the reboiler outlet line 44 has been estabilshed for 20 to 40 minutes, or until this effluent shows essentially no dissolved carbonaceous or tarry materials as indicated by visual color, the alcoholic flushing solution is stopped and stripping steam is added via line 31 to provide boil-up of alcohol in the stripper column to the extent that the bottoms (line 44) will contain 2 to 4 volume percent ethanol. When essentially all of the alcohol has been recovered, a water stream is continued once again at a rate of 2,000 to 4,000 gallons per hour, still maintaining a temperature less than 100° C. at the bottom of stripper 30. The reboiler outlet line 42 is closed off and the Dowtherm heat is increased to maintain a reboiler temperature of about 100 to 110° C. After a period of 2 to 4 hours, the extraneous water is cut off and the stripper contents are dumped through the reboiler, reboiler heat being held at about 100 to 110° C. during the dumping operation. Following the dumping of the total contents of both stripper and reboiler, normal operations are started once again.

The above described flushing operation may also be conducted on the stripper alone, excluding the reboiler. When this is done, reboiler inlet line 34 and vapor line 41 are blocked, and stripper bottoms are removed through line 102. Necessary heat is maintained in the stripper by using extraneous steam introduced through line 31, instead of the vapors from the reboiler vapor line 41.

In either method, the plant shutdown time is reduced to a mere 4 to 8 hours instead of the 4-6 days required for manual cleaning. Thus considerable labor cost and lost alcohol production are saved by the present invention.

Having described the general nature and a specific embodiment of the present invention, the true scope is now succinctly set forth in the appended claims.

What is claimed is:

1. In a process for recovering ethyl alcohol from an acid extract feed produced by the hydration of ethylene with concentrated sulfuric acid wherein said acid extract is fed into a stripping zone, the alcohol is removed overhead therefrom, acid-insoluble carbonaceous materials deposited in said stripping zone necessitating a periodic termination of said feed to said zone for the removal of said materials from said zone, the improvement which comprises passing dilute alcohol into said stripping zone and flushing said zone therewith, and removing said acid-insoluble carbonaceous materials from said stripping zone in solution with said dilute alcohol before normal process operations are resumed, said dilute alcohol being an alcohol consisting solely of carbon, hydrogen and oxygen constituents.

2. In a process for recovering ethyl alcohol from an acid extract feed produced by the hydration of ethylene with concentrated sulfuric acid wherein said extract is fed into a stripping zone, the alcohol is removed overhead therefrom, acid-insoluble carbonaceous materials deposited in said stripping zone necessitating a periodic termination of said feed to said zone to permit the removal of said materials from said zone, the improvement which comprises flushing said zone during said termination with the dilute alcohol product produced by said process, and removing said acid-insoluble carbonaceous materials from said stripping zone in solution with said dilute alcohol product before the normal process operations are resumed.

3. In a process for the production of ethyl alcohol wherein ethylene is absorbed and esterified by strong sulfuric acid in an absorption zone, the resulting acid extract is hydrolyzed with water in a mixing zone to form an equilibrium mixture of alcohol and ester, the dilute extract is fed to and stripped in a stripping zone with steam, alcohol is generated overhead and purified, acid-insoluble carbonaceous material is deposited in the stripping zone, the acid bottoms are removed to a reboiler and reconcentrated, and the flow of said diluted extract to said stripping zone is periodically terminated to permit the removal of said deposited acid-insoluble carbonaceous material from said stripping zone and said reboiler, the improvement which comprises passing a stream of a 10-20 volume percent solution of ethyl alcohol in water downwards through said stripper and reboiler until the effluent from said reboiler shows no visual color, then discontinuing the alcohol steam but continuing a water stream through said stripper and reboiler for an additional period, then discontinuing said water stream and emptying said stripper and reboiler before normal process operations are resumed.

4. In a process for the production of ethyl alcohol wherein ethylene is contacted with 96–100% $H_2SO_4$ in an absorption zone at a temperature of 60 to 80° C., the resulting acid extract of diethyl sulfate and monoethyl sulfate is mixed with water in a mixing zone at a temperature of 100–130° C., the hydrolyzed extract mixture is passed through a stripper where it is stripped with steam at a top temperature of 110 to 130° C., the crude ethyl alcohol is removed from the top of the stripper, and accumulated, the dilute acid is withdrawn from the bottom of the stripper to a reboiler operated at a pressure of 0 to 10 p. s. i. g. and a temperature of 130 to 150° C., the steam from said reboiler is recycled to said stripper via a vapor line, the partially reconcentrated $H_2SO_4$ from said reboiler is further reconcentrated, fortified, and recycled to said absorption zone, and wherein the passage of said hydrolyzed extract mixture to said stripper is periodically terminated to permit the removal from said stripper and said reboiler of acid-insoluble carbonaceous material deposited therein during the operation of said process, the improvement which comprises passing cool water downwards through said stripper and reboiler until the temperature at the bottom of the stripper is no greater than about 90° C., passing between about 9 and 30 volumes per volume of stripper tower per hour of said accumulated crude ethyl alcohol downwards through said stripper and reboiler for a period of 0 to 40 minutes, together with sufficient water to reduce the alcohol concentration to about 10 to 20 volume percent, maintaining a temperature of 90 to 110° C. in said reboiler, after said 20 to 40 minutes discontinuing the alcohol-water flow to said stripper, then adding sufficient steam to said stripper to cause alcohol to be stripped to the extent that the stripper effluent contains about 2 to 4 volume percent ethyl alcohol, recovering essentially all the wash alcohol, then passing once again a stream of water through said stripper and reboiler for an additional 2 to 4 hours while maintaining a reboiling temperature of 100 to 110° C., then discontinuing said stream of water, and dumping the contents of the stripper and reboiler before the normal process operations are recommenced.

5. A method for cleaning acid-insoluble carbonaceous materials from a stripping zone wherein ethyl alcohol is stripped from an acid extract derived from the hydration of ethylene with concentrated sulfuric acid and wherein said acid insoluble carbonaceous materials are deposited during the process of stripping said alcohol from said extract which comprises passing dilute water soluble alcohol which contains only carbon, hydrogen and oxygen constituents into said stripping zone, flushing said zone therewith and removing said acid-insoluble carbonaceous material from said stripping zone in solution with said dilute alcohol.

6. A method according to claim 5 wherein the said dilute alcohol is aqueous ethyl alcohol.

References Cited in the file of this patent

UNITED STATES PATENTS

| | | |
|---|---|---|
| 1,827,085 | Huff | Oct. 13, 1931 |
| 2,414,759 | Mottern | Jan. 21, 1947 |
| 2,419,076 | Horsley | Apr. 15, 1947 |
| 2,446,159 | Mottern | July 27, 1948 |
| 2,467,846 | Mottern | Apr. 19, 1949 |
| 2,470,206 | Archibald | May 17, 1949 |
| 2,794,704 | Paulsen | June 4, 1957 |
| 2,808,378 | Baldwin et al. | Oct. 1, 1957 |